United States Patent Office 2,966,275
Patented Dec. 27, 1960

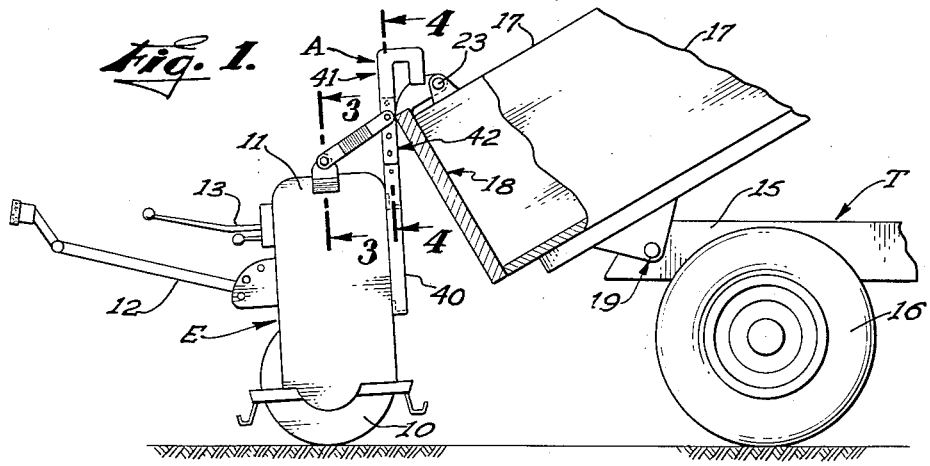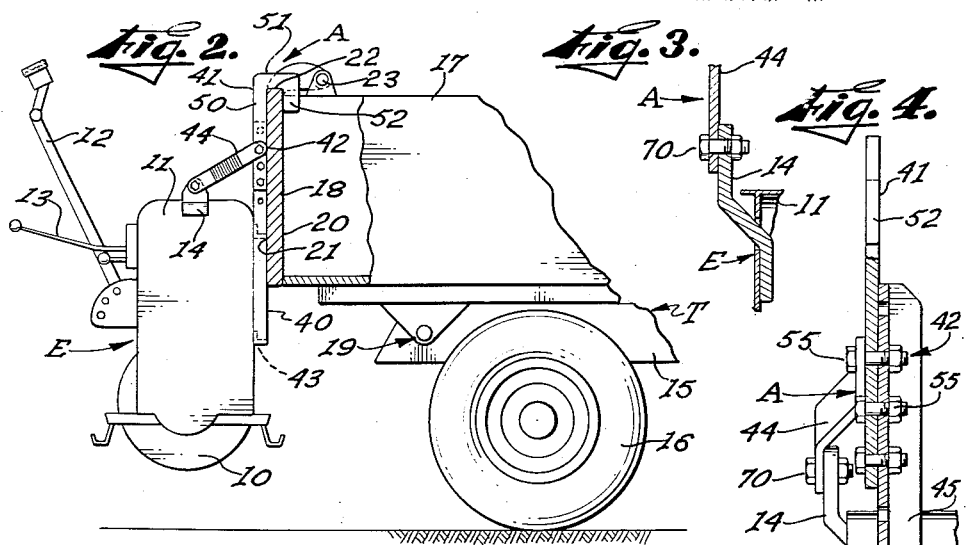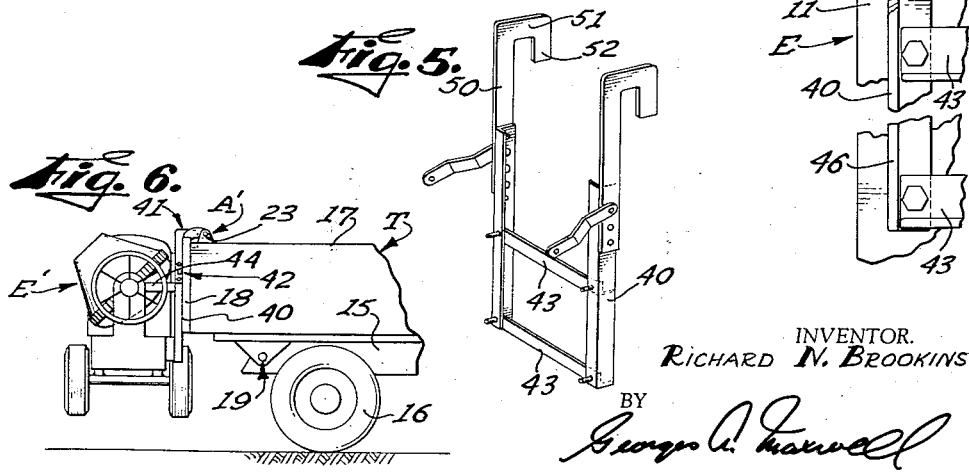

2,966,275

EQUIPMENT CARRIER

Richard N. Brookins, Long Beach, Calif., assignor to Essick Manufacturing Company, Los Angeles, Calif., a corporation of California Filed Apr. 22, 1957, Ser. No. 654,195

5 Claims. (Cl. 214—130)

This invention relates to a carrier for road building equipment, or the like, and is more particularly concerned with a carrier adapted to be releasably engaged with the tail gate of a dump truck to lift and carry, or set down, a piece of equipment attached thereto, as the bed of the dump truck is pivoted up and down.

In the course of building roads, or the like, various types of heavy equipment are used. Some of the equipment is primarily adapted for transport purposes and is such that it can carry a substantial load at a high rate of speed. The most common piece of transport equipment in connection with road building is the dump truck. Other equipment used in connection with the building of roads, and the like, include, hand operated road rollers, cement mixers and other small but relatively heavy machines and/or pieces of equipment each of which are either stationary or are only capable of low speeds.

It is common practice in road construction and repair to place the small stationary, or low speed equipment, in the bed of a dump truck, on a trailer or on the bed of a special transport truck when the equipment is to be moved from one location to an other.

In the case of immobile equipment, the said equipment must be manually lifted or otherwise hoisted into or onto the transport vehicle. While in the case of low speed mobile equipment, it is common practice to either hoist the equipment onto the transport vehicle or to provide suitable ramps applicable to the transport vehicle and up and down which the said equipment can be rolled or run.

In both of the above circumstances or situations, the time and effort involved in loading and unloading the equipment is considerable and costly. Still further, the loading and unloading of such equipment is often times extremely difficult and dangerous.

It will be apparent that when a dump truck is loaded with gravel or some other material, which it is primarily adapted to handle and carry, it cannot be employed to transport other equipment, with the result that a special transport truck or trailer must be provided to carry the equipment.

An object of the present invention is to provide an equipment carrier applicable to the tail gate of a dump truck to support a piece of equipment on the truck for transport.

Another object of the present invention is to provide a carrier of the character referred to which is fixed to a piece of equipment and is adapted to be releasably engaged with the tail gate of a dump truck when the bed of the truck is elevated or tipped, and to lift and support the equipment related thereto when the bed of the truck is lowered.

A further object of the present invention is to provide a carrier of the general character referred to that is easy and economical of manufacture and which is both highly effective and dependable in operation.

The various objects and features of my invention will be fully understood from the following detailed description of typical preferred forms and applications of my invention, throughout which description reference is made to the accompanying drawings, in which:

Fig. 1 is a side elevational view of a road roller with a carrier as provided by the present invention related thereto, and showing the roller, with the carrier, positioned adjacent the tail gate of a dump truck bed, preparatory to lifting the roller for support.

Fig. 2 is a view similar to Fig. 1 and showing the carrier engaged with the tail gate of the dump truck and the roller elevated and supported for transport by the truck.

Fig. 3 is an enlarged detailed sectional view of a portion of the construction illustrated in Fig. 1 and taken as indicated by line 3—3 on Fig. 1.

Fig. 4 is an enlarged detailed sectional view of a portion of the construction illustrated in Fig. 1 and taken as indicated by line 4—4 on Fig. 1.

Fig. 5 is a perspective view of the carrier that I provide showing it apart from the equipment and truck to which it is related.

Fig. 6 is a view similar to Fig. 2 and showing the carrier related to a cement mixer.

The carrier A provided by the present invention is adapted to be related to a piece of road building equipment E and to be releasably engaged with the tail gate of the bed of a dump truck T.

In Figs. 1 to 4 of the drawings, I have shown the piece of equipment E as being a power driven hand operated vibrating road roller. The road roller E is shown as including, generally, an elongate horizontally disposed pavement or road bed engaging roller 10, an engine housing 11 projecting upwardly from the roller and extending from one end thereof to the other, and a suitable handle 12 and control levers 13 projecting rearwardly from the housing. In addition to the foregoing, the road roller E is provided with a suitable frame (not shown), which frame occurs within the engine housing 11 and operatively couples and supports the various parts and portions of the construction, and an upwardly projecting apertured hoist strap 14 at each end of the housing and normally adapted to be engaged by suitable hooks, or the like, to facilitate hoisting the device when desired.

The particular road roller construction E illustrated in the drawings and briefly described above, is a relatively new standard piece of equipment and weighs approximately eight-hundred pounds.

In the drawings, I have diagrammatically illustrated the rear end portion of a conventional type of dump truck construction T, which construction is shown as including an elongate frame 15, supporting wheels 16, a rearwardly and upwardly opening dump bed 17 pivotally carried by the frame, and a tail gate 18 pivotally carried by the dump bed 17 and normally closing the rear end of the bed.

In accordance with conventional dump truck construction, the dump bed 17 is pivotally connected to the rear end portion of the truck frame 15 by suitable pivot means 19, which means occurs at a point spaced forwardly of the rear end of the dump bed, as clearly illustrated in Figs. 1, 2 and 5 of the drawings.

Suitable means (not shown) is provided on the truck frame 15, to elevate the forward end of the dump bed 17, to tip it rearwardly and upwardly about the pivot means 19, in the manner illustrated in Fig. 1 of the drawings, and so that the material, such as sand or gravel, carried in the dump bed can be dumped or spilled from the rear end of the bed.

With the above relationship of parts, it will be apparent that when the forward end of the dump bed is elevated and tipped, in the manner set forth above, the rear end portion of the bed and the tail gate 18 carried thereby are lowered a considerable distance and that when the forward portion of the bed is again lowered the rear end portion thereof and the tail gate are elevated.

The tail gate 18 on the dump bed 17 is a simple, flat rectangular member having flat front and rear sides 20 and 21 and a horizontally disposed top edge 22. The gate 18 extends across the open rear end of the dump bed and is pivotally connected to the sides of the bed by suitable pivot means 23, as clearly illustrated in the drawings. The pivot means 23 occur at the top ends of the gate so that when the dump bed is tilted in the manner previously set forth, the gate will swing open by its own weight.

In practice, a suitable latch means (not shown) is provided on the dump bed 17 to releasably engage and hold the gate 18 closed.

The carrier A provided by the present invention is shown as including a pair of posts 40 adapted to be secured to the equipment E, an inverted J-shaped hook 14 for each post and adapted to be releasably engaged with the tail gate 18 of the dump truck E, and adjustable coupling means 42 securing the hooks to the posts.

In addition to the foregoing, the carrier S is shown as including tie members 43 extending between and coupling the posts in fixed spaced relationship, and struts 44 carried by the posts and adapted to be fixed to the piece of equipment being handled, to stabilize the equipment on the carrier.

The posts 40 of the carrier A are simple, straight, vertically disposed members formed of angle iron and are shown as having laterally inwardly projecting flanges 45 occurring adjacent the forward side of the housing 11 of the roller construction E, and forwardly projecting side flanges 46.

The tie members 43 extending between the posts 40 are simple, horizontally disposed lengths of angle iron of predetermined length, and extend between the posts 40 in vertical spaced relationship to each other. Each member 43 has a vertically disposed flange 47, the ends of which establish flat bearing engagement with the flanges 45 of the posts 40. The tie members and posts are secured thereto by suitable screw fasteners 48. The uppermost tie member 47 is spaced below the upper terminal ends of the posts 40, while the lowermost tie member is fixed to and extends between the lower terminal ends of the posts 40.

With the above relationship of parts, it will be apparent that the posts 40 and tie members 47 cooperate to establish a rigid, rectangular, vertically disposed frame, which frame is, in the instant case, shown to occur adjacent the front side of the housing 11 of the road roller E.

In the particular construction illustrated, the screw fasteners 48 which connect the posts 40 and tie members 47 engage the housing 11 of the road roller and secure the frame established by the posts and tie members to the roller construction.

In practice, where the frame of the piece of equipment to which the carrier is secured will permit, the tie members 47 can be omitted and the posts 40 can be secured directly to the frame of the piece of equipment. In this modified form of my invention, the frame of the piece of equipment serves as the tie means between the posts and maintains them in spaced parallel relationship to each other.

The hooks 41 of my carrier are simple, inverted J-shaped hooks, formed of plate stock and are characterized by elongate vertically disposed legs 50, horizontally disposed tops 51 projecting forwardly from the upper terminal ends of the legs 50 and vertically disposed arms 52 of limited vertical extent depending from the forward ends of the tops 51.

The legs of the hooks are secured to the upper end portions of the posts 40 by the coupling means 42.

In practice, when the carrier is engaged with the tail gate 18 of the dump truck T, the legs 50 of the hooks occur adjacent and bear against the rear side 21 of the tail gate 18 of the dump truck T, the tops 51 overlie and rest on the upper or top edge 22 of the tail gate 18, and the arms 52 occur adjacent and engage the front side 21 of the tail gate 18, as clearly illustrated in Fig. 3 of the drawings.

In practice, the legs 50 of each hook are adapted to occur adjacent and establish butted engagement with the side flanges 46 of the posts 40.

The adjustable coupling means 42 securing the hooks 41 to the posts 40 is shown as including a plurality of vertically spaced apertures 60 and 61 provided in the legs 50 of the hooks and the upper portions of the flanges 46 of the posts, and a plurality of bolt-type screw fasteners 55 engaged through the registering openings 60 and 61 and rigidly securing the hooks to the posts.

With the above relationship of parts, it will be apparent that when the carrier A is applied or related to a different piece of equipment and/or when the piece of equipment with which the carrier is related is to be carried by a different dump truck than it had been previously carried by and having a tail gate of different height, the hooks 41 can be adjusted vertically relative to the posts so that the carrier A can be properly engaged with the tail gate of the dump truck.

It is to be understood, however, that when the carrier is engaged with a particular piece of equipment E, such as the roller illustrated in the drawings, and is adapted to be related to and carried by a particular dump truck or model of dump truck, wherein the vertical height of the tail gate is constant, the hooks 41 can be permanently secured to the posts 40 as by welding, in which case the hooks, in effect, become an integral part with the posts 40.

When the piece of equipment being handled is of considerable weight and/or projects a considerable distance rearwardly from the tail gate of the truck, it is desirable to provide suitable supporting and stabilizing struts 44. In the particular case illustrated, the struts 44 are shown as simple elongate straps fixed to and extending between the upper terminal ends of the posts 40 and the hoist straps 14 at the ends of the engine housing 11 on the roller 10. In the particular case illustrated, the struts 44 are shown secured to the hoist straps 14 of the roller E by suitable screw fasteners 70 and are shown secured to the upper ends of the posts by one of the screw fasteners 70 of the coupling means 42.

In operation, when it is desired to elevate or lift and transport the roller 10, with the carrier A provided by the present invention applied thereto, the roller is brought into close proximity with the tail gate 18 of the dump truck T, when the bed of the dump truck is in an elevated position and so that the posts 40 of the carrier A engage the tail gate, as clearly illustrated in Fig. 1, of the drawings. After the roller and carrier are in the position illustrated in Fig. 1, the bed 17 of the dump truck is lowered to its normal or horizontal position, whereupon the tail gate is elevated and engages the hooks 51 of the carrier and lifts the carrier and the equipment related thereto, in the manner illustrated in Fig. 2 of the drawings.

When it is desired to disengage the roller from the truck, the bed 17 of the truck is again elevated in the manner illustrated in Fig. 1 of the drawings and so that the roller is lowered into engagement with the road bed, whereupon the roller is free to be moved away from and out of engagement with the truck T.

In Fig. 6 of the drawings, I have shown the carrier A of the present invention related to a cement mixer E'. It is the purpose of this figure of the drawings to show that the carrier A provided by the present invention can be advantageously applied to various types of equipment.

Having described only typical preferred forms and application of my invention, I do not wish to be limited or restricted to the specific details herein set forth, but wish to reserve to myself any variations or modifications that may occur to those skilled in the art and fall within the scope of the following claims.

Having described my invention, I claim:

1. In combination, a truck having a frame, an elongate dump bed with front and rear ends pivoted to the frame at a point intermediate its ends and adapted to be pivoted longitudinally relative to the frame so that its front end is elevated and its rear end is lowered, a tail gate at the rear end of the dump bed and having a substantially horizontally disposed top edge, a piece of equipment, and an equipment carrier releasably connecting the said piece of equipment to the tail gate, said equipment carrier including, a frame fixed to the piece of equipment and forwardly projecting and downwardly opening hooks on the frame engageable over the tail gate of a dump bed when the forward end of the bed is tilted upwardly and engaged by the tail gate and elevated thereby when the said forward end of the dump bed is lowered, for support and transportation of the equipment.

2. In combination, a truck, an elongate, upwardly opening dump bed with front and rear ends and a tail gate at its rear end, means pivotally mounting the bed to the truck at a point spaced forward of the rear end of the bed, whereby the rear of the bed and the tail gate are lowered when the forward end of the bed is elevated relative to the truck, a piece of equipment having a plurality of vertically disposed posts projecting upwardly therefrom, and a forwardly projecting and downwardly opening hook on each post to project over the tail gate of the dump bed when the forward end of the bed is elevated and to be engaged by the tail gate and elevated thereby when the forward end of the dump bed is lowered for support and transportation of the equipment.

3. In combination, a truck, an elongate, upwardly opening dump bed with front and rear ends and a tail gate at its rear end, means pivotally mounting the bed to the truck at a point spaced forward of the rear end of the bed, whereby the rear of the bed and the tail gate are lowered when the forward end of the bed is elevated relative to the truck, a piece of equipment having a plurality of vertically disposed posts projecting upwardly therefrom, a plurality of forwardly projecting and downwardly opening hooks, vertically adjustable coupling means securing the hooks to the posts whereby said hooks project over the tail gate of the dump bed when the forward end of the bed is elevated and are engaged by the tail gate and elevated thereby when the forward end of the dump bed is lowered to elevate said piece of equipment for support and transportation of the equipment.

4. In combination, a truck, an elongate, upwardly opening dump bed with front and rear ends and a tail gate at its rear end, means pivotally mounting the bed to the truck at a point spaced forward of the rear end of the bed whereby the rear of the bed and the tail gate are lowered when the forward end of the bed is elevated relative to the truck, a piece of equipment supported on the ground and having a pair of vertically disposed posts fixed to and projecting upwardly therefrom, and a forwardly projecting and downwardly opening hook at the upper end of each post to project over the tail gate of the dump bed when the forward end of the bed is elevated and to be engaged by the tail gate and elevated thereby when the forward end of the dump bed is lowered for support and transportation of the equipment.

5. In combination, a truck, an elongate, upwardly opening dump bed with front and rear ends and a tail gate at its rear end, means pivotally mounting the bed to the truck at a point spaced forward of the rear end of the bed whereby the rear of the bed and the tail gate are lowered when the forward end of the bed is elevated relative to the truck, a piece of equipment supported on the ground and having a pair of vertically disposed posts fixed to and projecting upwardly therefrom, a plurality of forwardly projecting and downwardly opening hooks, vertically adjustable coupling means securing the hooks to the upper ends of the posts whereby said hooks project over the tail gate of the dump bed when the forward end of the bed is elevated and are engaged by the tail gate and elevated thereby when the forward end of the dump bed is lowered to elevate said piece of equipment clear of the ground for support and transportation of the equipment.

References Cited in the file of this patent

UNITED STATES PATENTS

| | | |
|---|---|---|
| 373,472 | Moser | Nov. 22, 1887 |
| 956,835 | Taulman | May 3, 1910 |
| 1,795,812 | Whiting | Mar. 10, 1931 |
| 1,924,074 | O'Halloran | Aug. 22, 1933 |
| 2,630,231 | Klinge | Mar. 3, 1953 |
| 2,701,658 | Radin et al. | Feb. 8, 1955 |
| 2,816,673 | Chapman | Dec. 17, 1957 |